(12) United States Patent
Underwood

(10) Patent No.: US 8,281,513 B2
(45) Date of Patent: Oct. 9, 2012

(54) FISHING ROD

(75) Inventor: Christopher John Underwood, Sale (GB)

(73) Assignee: D-Flex Limited (GB)

( * ) Notice: Subject to any disclaimer, the term of this patent is extended or adjusted under 35 U.S.C. 154(b) by 617 days.

(21) Appl. No.: 12/306,787

(22) PCT Filed: Jul. 6, 2007

(86) PCT No.: PCT/GB2007/002491
§ 371 (c)(1),
(2), (4) Date: Dec. 29, 2008

(87) PCT Pub. No.: WO2008/003959
PCT Pub. Date: Jan. 10, 2008

(65) Prior Publication Data
US 2009/0320352 A1    Dec. 31, 2009

(30) Foreign Application Priority Data
Jul. 6, 2006    (GB) .................................. 0613424.1

(51) Int. Cl.
*A01K 87/00* (2006.01)
(52) U.S. Cl. ...................... 43/18.1 R; 43/18.5
(58) Field of Classification Search ............... 43/18.1 R, 43/18.5, 18.1 CT
See application file for complete search history.

(56) References Cited

U.S. PATENT DOCUMENTS

| | | | | |
|---|---|---|---|---|
| 386,320 A * | 7/1888 | Horton | ................ | 43/18.1 R |
| 1,371,261 A * | 3/1921 | Price | ................ | 43/18.1 R |
| 2,341,053 A * | 2/1944 | Mason | ................ | 43/18.1 R |
| 3,369,320 A * | 2/1968 | Hronas et al. | ................ | 446/468 |
| 3,401,482 A * | 9/1968 | Burns | ................ | 43/18.1 R |
| 3,445,952 A * | 5/1969 | Ferman | ................ | 43/18.5 |
| 4,074,778 A * | 2/1978 | Morrell et al. | ................ | 175/91 |
| 4,422,259 A * | 12/1983 | Shimano | ................ | 43/18.1 R |
| 4,582,758 A * | 4/1986 | Bruce et al. | ................ | 43/18.1 R |
| 4,686,787 A * | 8/1987 | Whipp | ................ | 43/18.5 |
| 5,152,592 A * | 10/1992 | Krayer | ................ | 312/238 |
| 5,534,203 A * | 7/1996 | Nelson et al. | ................ | 264/101 |
| 5,866,419 A * | 2/1999 | Meder | ................ | 435/394 |
| 6,145,237 A * | 11/2000 | Young | ................ | 43/18.1 R |
| 6,286,244 B1 * | 9/2001 | Weiss | ................ | 43/18.1 R |
| 6,390,411 B1 * | 5/2002 | Chal et al. | ................ | 242/613.2 |

(Continued)

FOREIGN PATENT DOCUMENTS
DE    4101151 A1 *    7/1992

(Continued)

OTHER PUBLICATIONS
International Search Report for corresponding Application No. PCT/GB2007/002491 mailed Oct. 9, 2007.

*Primary Examiner* — Darren W Ark
(74) *Attorney, Agent, or Firm* — Renner, Otto, Boiselle & Sklar, LLP

(57) ABSTRACT

A fishing rod, and a method of manufacturing a tubular structure such as a fishing rod. The fishing rod extends within a plane (210). At least a portion of the rod (202) has a flexural rigidity in a first direction (B) within the plane different from the flexural rigidity in the opposite direction (A) within the plane. The difference in flexural rigidity between said directions is at least 5% of the value of the flexural rigidity in the first direction.

10 Claims, 7 Drawing Sheets

U.S. PATENT DOCUMENTS

| | | | |
|---|---|---|---|
| 6,505,430 B1 * | 1/2003 | Tsurufuji et al. | 43/18.1 HR |
| 6,601,334 B1 * | 8/2003 | Ono et al. | 43/18.1 R |
| 7,584,571 B2 * | 9/2009 | Ryan | 43/18.5 |
| 8,001,716 B1 * | 8/2011 | Lepage et al. | 43/18.1 CT |
| 2002/0092225 A1 * | 7/2002 | Watanabe | 43/18.1 |
| 2007/0187132 A1 * | 8/2007 | Watt | 174/113 R |
| 2007/0294932 A1 * | 12/2007 | Loke | 43/18.1 R |
| 2011/0188923 A1 * | 8/2011 | Lafleur et al. | 403/53 |
| 2011/0254242 A1 * | 10/2011 | Eismann et al. | 280/124.106 |
| 2011/0302109 A1 * | 12/2011 | Suffield | 705/500 |

FOREIGN PATENT DOCUMENTS

| | | |
|---|---|---|
| FR | 2 481 575 | 11/1981 |
| FR | 2 686 220 | 7/1993 |
| GB | 1172666 | 6/1968 |
| GB | 2178998 A * | 2/1987 |
| GB | 2250412 A | 6/1992 |
| JP | 03162934 A * | 7/1991 |
| JP | 03239501 A * | 10/1991 |
| JP | 2002159247 A * | 6/2002 |
| JP | 2002209481 A * | 7/2002 |
| JP | 2002306030 A * | 10/2002 |
| JP | 2004000102 A * | 1/2004 |
| JP | 2004073167 A * | 3/2004 |
| JP | 2005278520 A * | 10/2005 |
| JP | 2006094759 A * | 4/2006 |
| JP | 2011041516 A * | 3/2011 |

* cited by examiner

FISHING ROD

The present invention relates to a fishing rod and to a method of manufacture of a fishing rod. Fishing rods may be categorised generally as fly rods, casting rods and fishing poles. The present invention also relates to a method of manufacturing tubular structures.

A fly rod is a fishing rod which casts a relatively light lure ("fly") attached to a relatively heavy fishing line ("flyline"). A casting rod is a fishing rod which casts a relatively heavy lure attached to a relatively light fishing line. Fly rods and casting rods each require a different, associated casting action/process to cast a lure into position. A fishing pole is a fishing rod which does not employ a casting process to position a lure.

FIG. 1A shows a typical fishing rod 10, which may be a fly rod or a casting rod. The fishing rod comprises a tube 12 extending along a longitudinal axis. At least one handle or grip 14 is affixed to the tube 12, at an end of the tube distant from the rod tip 16. The tube diameter typically tapers from the handle 14 toward the tip 16, such that the tip is most flexible. A series of rings or guides 18 are positioned along the length of the rod 10. The rings or guides 18 are positioned to guide the fishing line along the length of the rod. The rings 18 define the casting direction of the rod when in use. The rings are located adjacent to one side of the rod, extending from the rod in the casting direction of the rod (i.e. the direction in which the fishing line 22 is cast).

In use, a fishing reel 20 is affixed to the rod 10, adjacent to the grip 14. Fishing line 22 extends from the reel 20, through the rings 18, towards the rod tip 16. Typically, the fishing line 22 terminates in a lure 24 for fish, such as a fishing fly.

During use, the rod is cast such that the lure 24 is directed towards the intended target (i.e. towards the desired position in the water being fished). During casting, the rod is swung backwards relative to the angler, such that at least the rod tip 16' bends backwards (in direction A, in FIG. 1B), away from the casting direction. The rod is then swung forwards, such that at least the tip 16" bends forwards i.e. in the casting direction (indicated by arrow B in FIG. 1C). The static position of tip 16 is illustrated by a dotted line in FIGS. 1B and 1C.

Although in the Figures, only the tip of the rod is illustrated as flexing, many fishing rods (particularly fly fishing rods) are constructed such that the whole of the rod bends or flexes to some degree. Further, the degree of flex of the fishing rod during the casting process can be much greater than that illustrated in the Figures.

In many types of fishing, but particularly in fly-fishing, it is desirable for the angler to be able to repeatedly cast the lure accurately on the same target. In some types of fishing, such as spinning (also known as spin casting) and surf fishing, it is particularly desirable to be able to cast the lure a long distance. For example, in surf fishing, it is desirable to be able to cast the lure beyond the position where the ocean surf breaks, into an area where fish congregate.

GB 1,172,666 describes how it is desirable for a fishing rod to be stable in the casting plane for accurate casting, as otherwise a fisherman must steady the rod during casting. Such stabilisation tends to reduce the forces actually available for casting. With a view to allowing accurate casting at a great distance, GB 1,172,666 describes a fishing rod construction in which a tubular section of a fishing rod has an eccentric bore with respect to the tube wall. Such a construction is described as increasing stability of the rod in the casting plane, allowing a longer cast to be achieved without the need for the use of steadying forces.

United States patent application US 2002/0092225 A1 attempts to address a similar problem, by providing a fly rod having a non-regular hexagonal cross-section. Such a cross-section is described as providing a greater flexural rigidity of the rod in the plane perpendicular to (i.e. transverse) the casting direction of the rod, and the flexural rigidity in the casted direction of the rod. Thus, it is harder to bend the rod in the transverse direction, than in the casting direction, allowing the angler to cast more easily and accurately towards the intended target.

It is an aim of embodiments of the present invention to provide an improved fishing rod.

In a first aspect, the present invention provides a fishing rod extending within a plane, wherein at least a portion of the rod has a flexural rigidity in a first direction within the plane different from the flexural rigidity in the opposite direction within the plane, the difference in flexural rigidity between said directions being at least 5% of the value of the flexural rigidity in the first direction.

Providing such a difference in flexural rigidity is in the plane between the casting direction and the opposite direction to the casting direction, it allows the bending motion of the rod (as the rod is cast) to be fine tuned to meet desired performance criteria. For example, in the case of a fly rod if the flexural rigidity in the casting direction is greater than the flexural rigidity in the opposite direction, the rod is less likely to over bend when the line is being cast forward. This can alleviate the problem of the prior art relating to over bending of the rod tip that can result in a foreshortened cast, as well as the problem of the tip oscillating (both of which can lead to an inaccurate cast), whilst still allowing the rod to bend backwards to a larger degree so as to allow a long distance cast.

This difference in flexural rigidity can also be advantageous in fishing poles, to reduce the degree of droop of the rod tip when in use.

The first direction may be the casting direction.

The flexural rigidity in the first direction may be greater than the flexural rigidity in the opposite direction.

Said portion may extend at least along one third of the total length of the rod.

Said portion may extend from the rod tip towards the rod handle.

Said portion may extend from the rod handle towards the rod tip.

Said portion may be an intermediate portion positioned partway along the rod length.

Said portion may extend from at least the rod tip to the rod handle.

The rod may be of tubular construction, including internal bracing located within the tubular construction for providing a difference in flexural rigidity between the first direction and the opposite direction.

The rod may have an asymmetric mass distribution for providing said difference in flexural rigidity between the first direction and the opposite direction.

The rod may comprise at least a first longitudinally extending element having a first flexural rigidity, and a second longitudinally extending element having a second, different flexural rigidity, said first element being located adjacent the first direction, and the second element being located adjacent the opposite direction.

The cross-section of said portion may be formed in a shape that has mirror symmetry about said plane but lacks mirror symmetry about a further plane bisecting the rod, perpendicular to said plane.

The cross-section of said portion may be formed in a shape that is a curve of constant width.

The cross-section of said portion may be formed as a polygon having an odd number of sides, with an apex of the polygon being located within the plane.

Said polygon may be a regular polygon.

Said polygon may be an irregular polygon

Said polygon may be a Reuleaux polygon. Said polygon may be one of: a triangle, a pentagon, and a heptagon.

The rod may be a longitudinally tapered tube, with a cross-section that is a non-circular curve of constant width and of uniform wall thickness.

The rod may be a fly rod. The rod may be a casting rod. The rod may be a fishing pole.

The rod may further comprise a sign indicative of the direction within said plane having the greatest flexural rigidity.

In a second aspect, the present invention provides a method of manufacturing a fishing rod extending within a plane, comprising the step of forming a fishing rod with at least a portion of the rod having a flexural rigidity in a first direction within the plane different from the flexural rigidity in the opposite direction within the plane, the difference in flexural rigidity between said directions being at least 5% of the value of the flexural rigidity in the first direction.

The method may comprise: wrapping a flexible material around a mandrel; curing the material to form a tube; and removing the mandrel from the tube.

Said mandrel may have a cross-section that is a non-circular curve of constant width.

In a third aspect, the present invention provides a method of manufacturing a tubular structure, comprising: wrapping a flexible material around a mandrel; curing the material to form a tubular structure; and removing the mandrel from the tubular structure, wherein the mandrel comprises a non-circular cross-section that is a curve of constant width.

Said mandrel may comprise a polygonal cross-section having an odd number of sides.

Said material may comprise carbon fibre.

In a fourth aspect, the present invention provides a mandrel comprising a non-circular cross-section that is a curve of constant width.

Embodiments of the present invention will now be described, by way of example only, with reference to the accompanying drawings, in which.

Figure 1A:
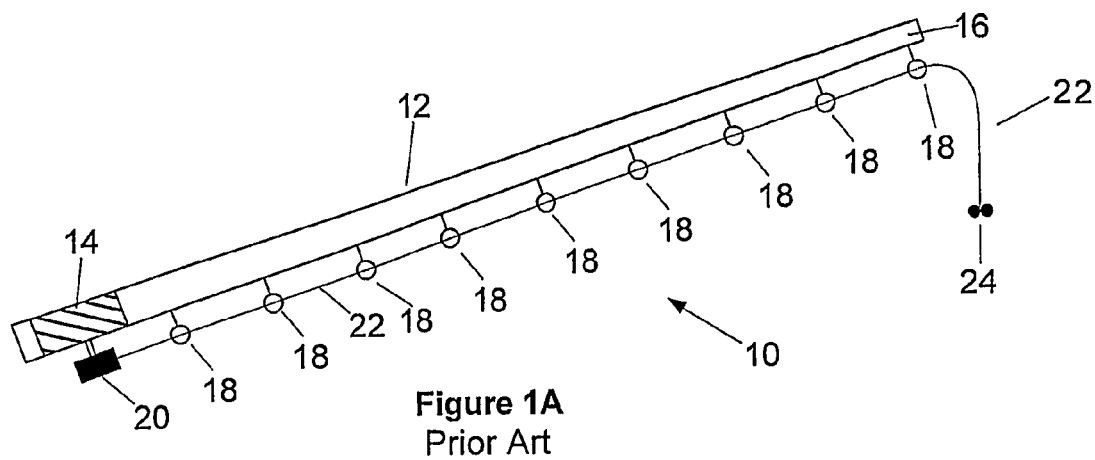
FIG. 1A illustrates a typical prior art fishing rod.

The present inventor has realised, that providing a fishing rod in which the flexural rigidity in a first direction within a plane is different from the flexural rigidity in the opposite direction, allows fishing rods to be produced having new, desirable properties. Fishing rods extend along a longitudinal axis, and the longitudinal axis will lie within the plane.

The properties and behaviour of prior art fishing rod blanks (the basic tubular structure to which the required fittings, e.g. line guides, handles, etc, are attached to produce a functional fishing rod) and finished fishing rods currently commercially available are generally symmetrical in all directions. Manufacturers male great efforts to ensure the uniformity of their products in this respect, within small manufacturing tolerances. The rod designer/builder is faced with a choice of flexural properties when creating a rod for a particular use or customer demand, based upon a combination of mechanical properties (elastic modulus of the material(s) of construction) and degree of dimensional tapering and/or wall thickness along the rod blank. The terminology used to describe the (multi-factorial) behaviour/characteristics of, for example, fly rods is not uniform or standardised within the rod making industry, and is generally subjective in nature rather than objective or measurement based. In the most general/simplistic terms, fly rods can be produced with a stiff/fast/short action, a soft/slow/long action or, often, a compromise action somewhere in between these extremes. For example, soft action fly rods are generally easier to use and allow better consistency/repeatability for the caster, but are usually less able at casting longer distances. Conversely, stiff action fly rods are generally chosen by the more skilful/experienced caster because, although generally requiring greater expertise, greater casting distances are achievable and often with greater accuracy also.

For casting rods a more objective approach to the description of properties is often adopted, for example the weight/load required to bend the rod tip through 90 degrees in relation to the rod handle may be used for general differentiation of flexural characteristics, known as the "test curve", such that a stiffer rod has a higher test curve than a less stiff rod. A higher test curve/stiffer casting rod will cast a heavier lure a greater distance than a lower test curve/softer rod, but conversely will be less suitable for playing a hooked fish.

The present inventor has appreciated that it would be desirable to be able to offer a rod that combines the benefits of each type of action, but to do so requires the characteristics exhibited by the rod to vary during the casting process, for example in the case of a fly rod with a combination of a soft action during the back cast and a stiff action during the forward cast being generally preferable. For a casting rod, it may be preferable to have a stiff action during the back cast and a soft action during the forward cast. For a rod to have this ability, the present inventor has realised that the rod should preferably demonstrate a differential in flexural rigidity within the casting plane i.e. the flexural rigidity in the casting direction is different to the flexural rigidity in the opposite direction. This is a novel feature and contrary to the design of existing rods.

To facilitate an understanding of the invention, a brief explanation will now be given as to the principles behind how a fly rod and a casting rod can cast a lure, as appreciated by the present inventor.

For a fly rod, typically the rod is pre-positioned to extend in front of the caster, such that the relatively long fishing line and attached lure generally extends straight out beyond the rod tip on the water surface. The length of fishing line is fixed, temporarily, by constraint on/by a fishing reel, but may be varied by the caster at will. The initial back-casting stroke is commenced such that the caster imparts an accelerating upward/rearward motion to the tip of the rod via the rod handle i.e. the rod is moved backwards within the casting plane as a rotating lever. This motion is sufficient to overcome the inertia of the length of fishing line and position at least part of the fishing line above/behind the caster, thus bending the flexible rod into a rearward pointing arc ("loading the rod"). The fishing line (flyline) is purposely relatively heavy/massive to induce this effect. The weight of the relatively light lure (fly) has negligible effect. This action converts kinetic energy from the induced motion of the fishing line and rod itself into stored potential energy within the rod and fishing line.

The forward casting stroke must quickly follow the backward casting stroke, exactly how quickly depending upon the flexural characteristics of the rod. A stiff action rod will flex less and allow the caster less time. A soft action rod will load with more subjective "feel", which is generally considered advantageous in this respect. If the forward stroke is too late, the transiently stored potential energy from the backward casting stroke will be lost, resulting in tension disappearing, the fishing line falling to ground and the rod straightening prematurely, and the overall cast failing. In the forward casting stroke the caster imparts a forward/downward acceleration/motion to the tip of the (flexed) rod, thus generating further kinetic energy in addition to that transferred back to the fishing line from the action of the rod recovering, spring-like, from flexing and straightening at the end of the stroke. This results in the fishing line, together with the attached lure, being propelled outwards/forwards as desired, in the casting direction. Momentum will further bend the rod into an energy sapping forward/downward pointing arc, most severe with a soft action rod. Recovery from the resultant oscillation of the rod tip is better/quicker with a stiff action rod.

For a casting rod, typically the rod is pre-positioned to extend behind the caster, such that the relatively short fishing line and attached lure hang from the rod tip above ground/water level. At this point any tension in the line and/or deflection of the flexible rod is due only to the relatively heavy weight of the lure. The weight of the relatively light fishing line has negligible effect. The length of fishing line is fixed, temporarily, by constraint on/by a fishing reel. The casting action is a single, accelerating upwards/forwards motion imparted by the caster via the rod handle to the rod tip, and via the fishing line to the lure, i.e. the rod is moved forwards within the casting plane as a rotating lever. The initial motion is sufficient to overcome the combined inertia of the mass of the lure and of the rod itself to transiently bend ("load") the flexible rod into a rearward facing arc, thus converting kinetic energy into stored potential energy. The motion of the rod tip continues to accelerate the lure in an arc, until at the end of the casting stroke the caster ceases to impart motion to the rod handle. The motion of the rod tip continues as the rod straightens, with the stored potential energy within the flexed rod transferring back to the lure as additional kinetic energy. At the point when the rod is straight, the caster releases the constraint upon the fishing line to allow the attached lure to exit the arc and continue to travel forwards in the intended direction of the cast.

The present inventor has appreciated that the extent/shape of the rod arc (curvature of the rod) as it flexes during the casting process, will in part be determined by the intrinsic flexural characteristics of the rod. Prior art fishing rods have flexural characteristics that are symmetric within the casting plane (i.e. such rods are understood to have the same flexural rigidity in the casting direction as in the opposite direction).

The majority of rods are tapered from a thick section adjacent the rod handle, to a thinner section at the rod tip. One of the known problems faced by rod designers is to minimise the detrimental oscillatory flexing of the rod, particularly that of the thin, flexible rod tip, which is induced by the alternating rearwards/forwards motion experienced by the rod during the casting process. Such unwanted oscillatory flexing of the rod tip continues after the forward/backward motion has terminated. To overcome such a problem, prior. art rods are known that utilise relatively stiff materials within the rod tip. Whilst utilising such stiff materials reduces the unwanted oscillatory motion of the rod tip, it also reduces the flexing of the rod tip during the back cast, and thus undesirably reduces the energy stored within the rod during the back cast.

Flexural rigidity is the force couple required to bend a rigid structure to a unit curvature. Flexural rigidity typically varies along the length of a beam or rod, as a function of the rod length. Flexural rigidity indicates the degree to which a rod will bend. Thus, having a different flexural rigidity in the casting direction, compared to the opposite direction to the casting direction (i.e. a differential or asymmetric flexural rigidity within the casting plane), will lead to a rod that bends differently in the forward (casting direction), compared to the backward direction.

Such an asymmetric flexural rigidity allows a greater variation in the fishing rod design, and allows unique characteristics to be advantageously incorporated into the fishing rod. For example, the fishing rod could be arranged such that the tip portion of the rod has a greater flexural rigidity in the casting direction, than in the opposite direction to the casting direction. Thus, when the rod is swung backwards to cast, the rod tip will bend to a relatively large degree, storing the kinetic energy of the cast, whilst when the rod is flicked forward to cast in the casting direction, the rod tip will not bend as much, decreasing the likelihood of the rod tip over-bending, or oscillatory flexing, and producing a more accurate cast.

Such an asymmetric flexural rigidity is particularly suitable for fly fishing rods, which generally tend to be relatively flexible. Fly fishing rods are typically formed as tapered tubes of carbon fibre. The fishing rod may be formed as a series of multi-section tubes. A typical fly fishing rod ranges in length between 2 meters and 6 meters. However, it should be appreciated that such asymmetric flexural rigidity can be implemented in any type of fishing rod, including casting rods (also known, for example, as course fishing rods, spinning fishing rods, bait fishing rods, surf fishing rods etc.) and fishing poles.

Such an asymmetric flexural rigidity can be implemented along any longitudinal portion of the rod (e.g. the tip of the rod, the base portion of the rod adjacent to the rod handle, or an intermediate portion midway between the tip and handle), or to the whole rod. The portion of the rod can be any percentage of the total length of the rod e.g. at least 10%, 20%, 30%, 40%, 50% or 100%. Further, the difference in flexural rigidity between the casting direction (i.e. the forwards direction within the casting plane) and the opposite direction to the casting direction (the backwards direction within the casting plane), can represent any percentage of the value of the flexural rigidity in the casting direction e.g. at least 5%, 10%, 20%, 30%, 40%, 50%, 60%, 70%, 80%, 90% or 100%.

Figure 1B:
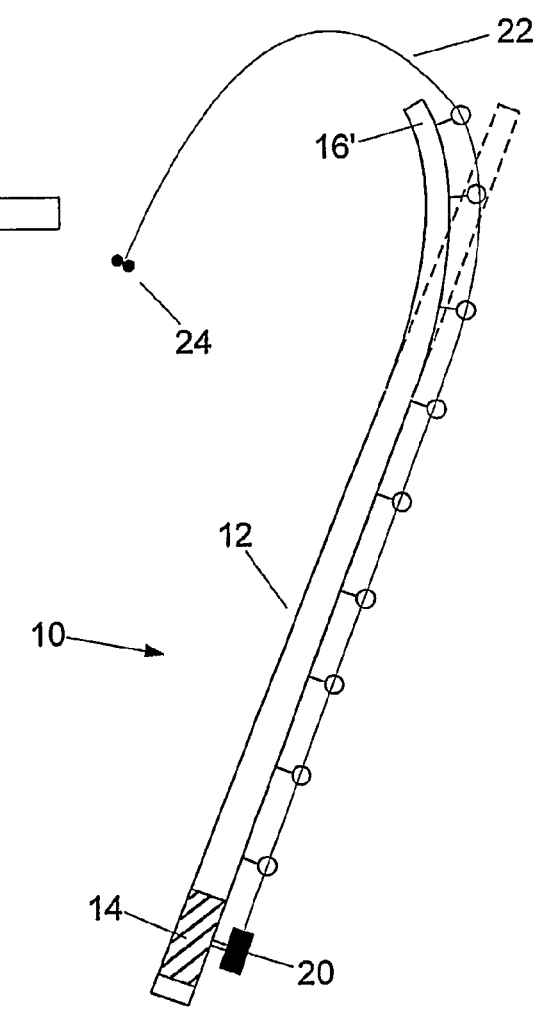
FIGS. 1B and 1C illustrate the bending motion of the rod as the rod is cast (dotted line illustrates the static position of rod tip)
Figure 1C:
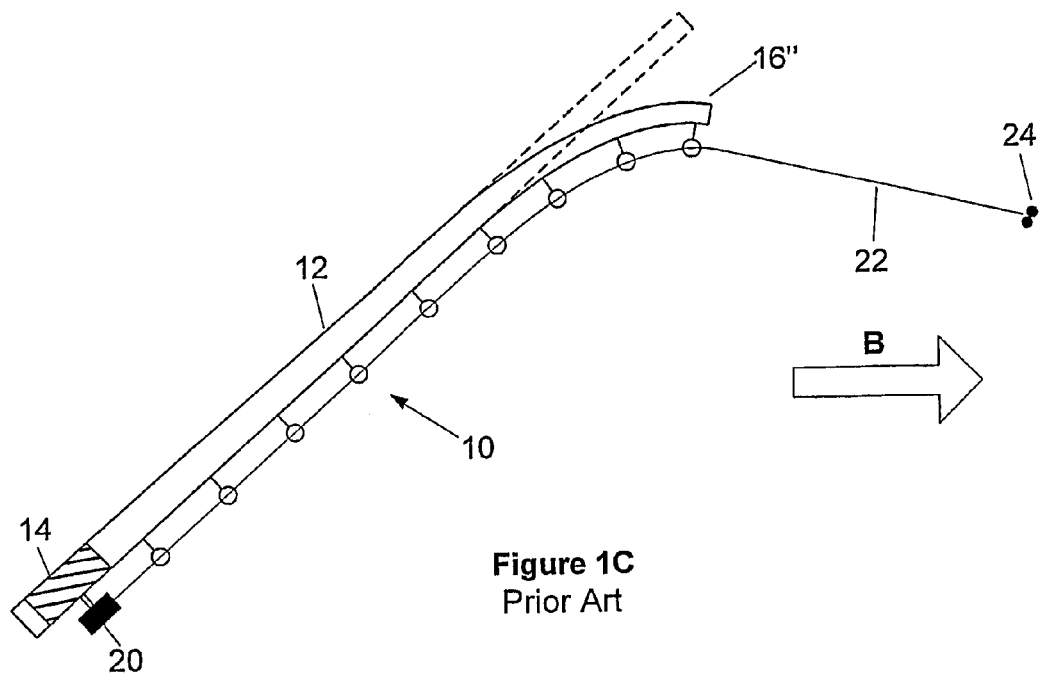
Figure 2:
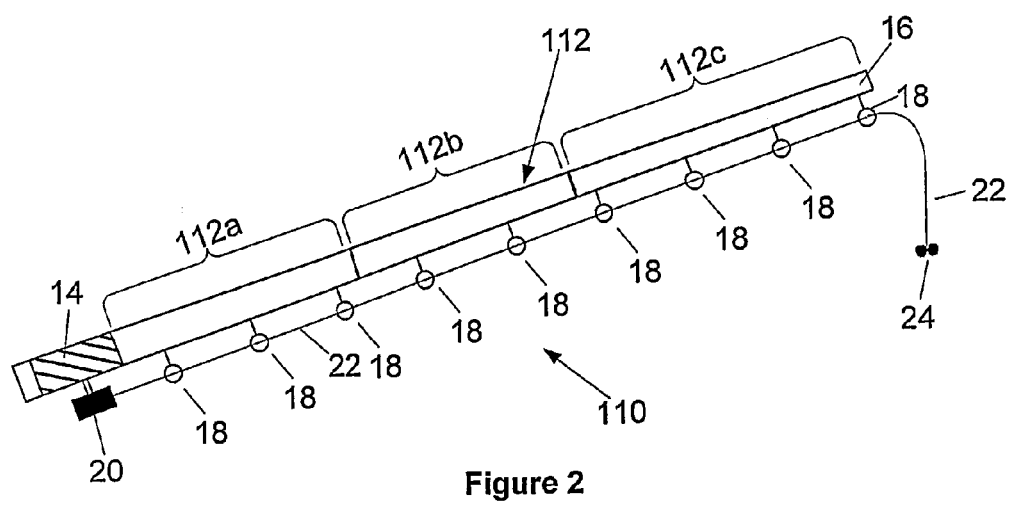
FIG. 2 illustrates a fishing rod in accordance with embodiments of the present invention.

FIG. 2 illustrates a fishing rod 110 formed in accordance with an embodiment of the present invention. Identical reference numerals are utilised to represent similar features to the prior art fishing rod illustrated in FIGS. 1A-1C. The distinguishing feature of the fishing rod 110 is that the fishing rod body 112 is formed to have an asymmetric flexural rigidity within the casting plane. Typically, the fishing rod body 112 will otherwise have similar features to the tube 12 used to form the prior art fishing rod 10. For example, the rod body 112 will typically be formed as a tube extending along a longitudinal axis. Typically, the tube 112 will have a cylindrical bore. The fishing rod body 112 may be formed as a series of discrete sections (e.g. three sections 112a, 112b, 112c), which are attached together to form the rod body. Such sections can be connected together using known connecting techniques (e.g. cylindrical plugs and receiving sockets) as are used in prior art fishing rods.

The distinguishing feature of the fishing rod 110 is that at least a (longitudinal) portion of the rod possesses asymmetric flexural rigidity within the casting plane. The present inventor has realised that such asymmetric flexural rigidity can be implemented using a number of different configurations.

Asymmetrical flexural rigidity within a plane can be realised by a variety of techniques including: forming a rod having a particular cross-sectional shape, using materials having different flexural rigidities to form the rod, providing suitable inserts within the rod (assuming the rod is hollow), or any combination of the aforesaid.

Different possible configurations of the rod body 112 will now be described with reference to FIGS. 3A-5D. The different configurations will be described with reference to cross-sections through the rod body. However, it should be appreciated that the whole of the length of the rod need not be uniform. For example, the rod could taper from the handle towards the tip. Equally, different longitudinal portions of the rod (or even fractions of portions) could have different shaped or sized cross-sections, depending upon the desired characteristics of the fishing rod, and the particular materials forming the rod body 112.

Within the figures, the body of the rod will be indicated by the reference numeral 202. In most implementations, to facilitate manufacturing of the rod, it is envisaged that the rod will be formed as a tube i.e. it will have a tube wall defining a bore. In the following figures, the bore is indicated by the reference numeral 200, and is generally indicated as being of circular cross-section. However, it should be appreciated that the bore 200 could be of any cross-section. Further, in most embodiments, the fishing rod need not comprise a bore. In those embodiments which include inserts to be inserted within the bore, then the bore could, in any event, be filled with an additional material after the insert has been placed into the bore.

Within FIGS. 3A-5D, the casting plane is indicated by the reference numeral 210. The casting direction (also termed the forward casting direction) is indicated by an arrow B, and the opposite direction (the back casting direction) indicated by the arrow A. In each instance, the cross-section of the rod body is indicated as having a particular orientation with respect to the casting direction, with such an orientation generally corresponding to an increase in flexural rigidity in relation to the casting direction compared to the opposite direction. However, it should be appreciated that alternative embodiments would fall within the scope of the claims, that are orientated in the opposite direction (e.g. the isosceles triangle of FIG. 3A could have the apex pointing in the opposite direction, rather than the casting direction).

Embodiments of the present invention will now be described with reference to FIGS. 3A-3C, which can provide asymmetric flexural rigidity by providing cross-sections having different shapes. In each of these instances, the shape is symmetric (possesses mirror symmetry) about the casting plane 210. Such asymmetry ensures that the rod is laterally stable. However, in each instance, the rod is asymmetric about a plane perpendicular to the casting plane 210 (this perpendicular plane bisecting the rod). Such an asymmetry provides the desired asymmetric flexural rigidity within the casting plane.

Figure 3A:
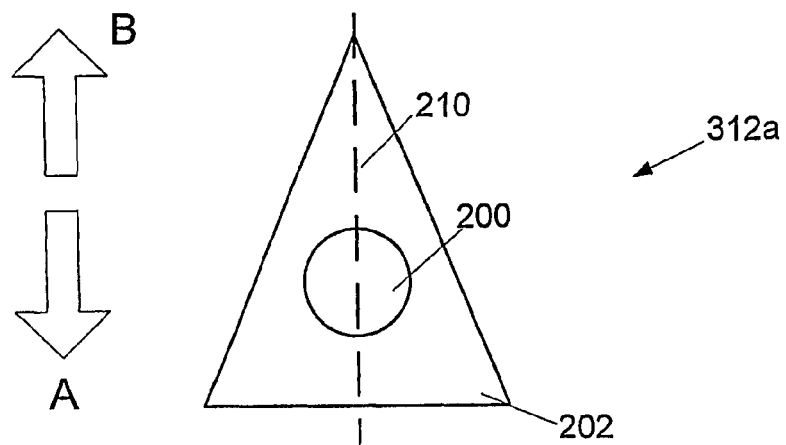
FIGS. 3A-3C illustrates different, alternative cross-sections of the fishing rod of FIG. 2 in accordance with alternative embodiments of the present invention.

FIG. 3A shows a rod cross-section 312a formed as an isosceles triangle. The triangle is oriented to be symmetrical about the casting plane 210. A cylindrical bore 200 extends through the rod body 202. As with the other embodiments described with reference to FIGS. 3B, 3C and 4B-5D, such a configuration can be used to dampen unwanted tip oscillations e.g. by forming the tip having such a cross-section and/or the whole rod having such a cross-section.

The isosceles triangle is oriented to have mirror symmetry about the casting plane 210. The apex of the triangle is oriented adjacent the forward casting direction, to thereby limit flexing in that direction whilst allowing relatively more/easier flexing in the opposite direction to the casting direction.

Figure 3B:
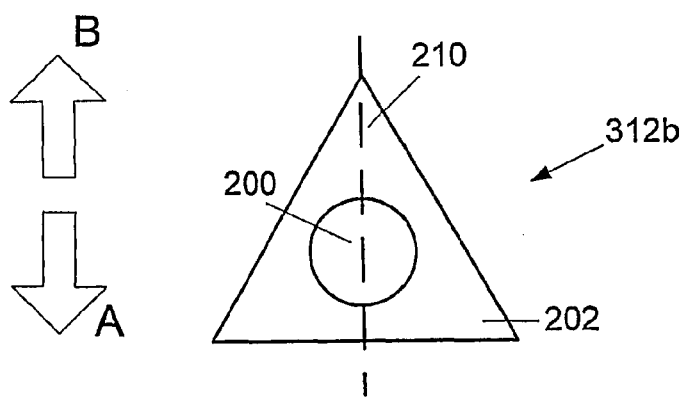
Figure 3C:
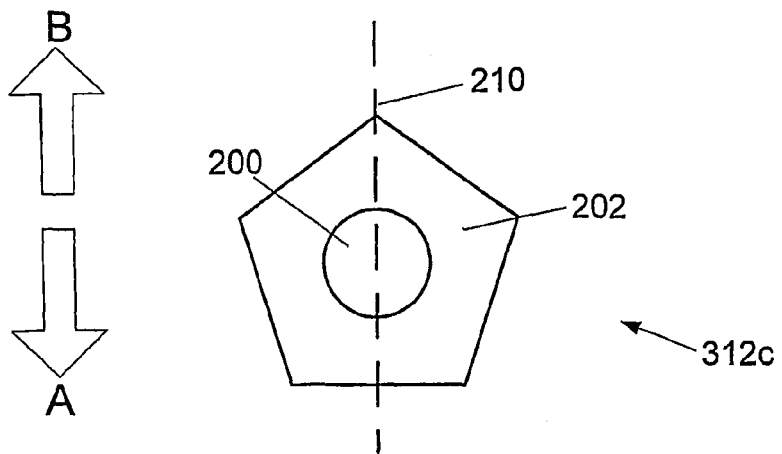

In FIG. 3B, the rod body has a cross-section 312b shaped as an equilateral triangle. Again an apex of the triangle is oriented along the casting plane 210, with that apex pointing towards the casting direction.

Although FIG. 3B is directed to a three-sided regular polygon (regular indicating that the polygon has sides of equal length), it should be appreciated that the rod could be formed as any regular polygon having odd-numbered sides. For example, FIG. 3C illustrates the rod being formed having a cross-section 312c in the shape of a pentagon (i.e. the rod being formed as a pentagonal tube).

Figure 4A:
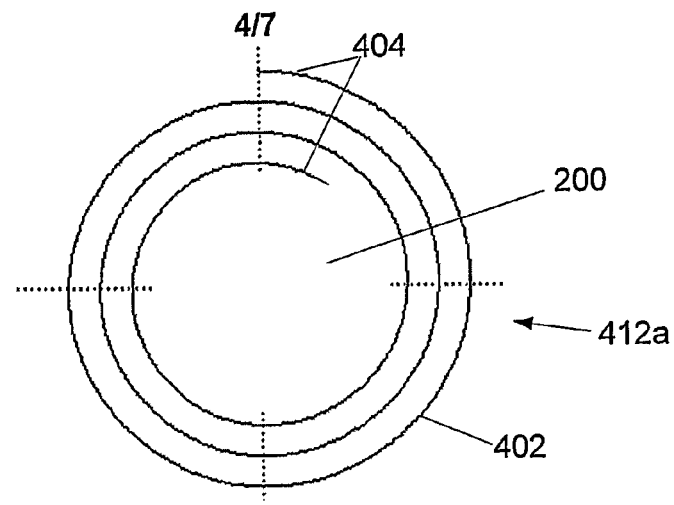
FIG. 4A illustrates a cross-section through a rod formed by wrapping of material around a mandrel.

FIG. 4A illustrates a cross-section 412a through a fishing rod formed by wrapping material 402 around a mandrel. For example, the material could comprise carbon fibre e.g. be a composite material comprising carbon fibre (or other fibre, such as glass fibre) within a binder such as epoxy. After wrapping of the sheet material around the mandrel, the material would then be cured to stiffen the material to form the rod body 202. The mandrel would then be removed from the body 202, to leave the central bore 200. The technique may result in the formation of a spine in the rod, due to the overlapping of the ends 404 of the material 402. Such a technique can be used to form rods in accordance with embodiments of the present invention, and is a known technique for forming prior art fishing rods. However, it is believed that such prior art rods have minimal difference in flexural rigidity in different directions, with such prior art techniques being directed to ensure that a minimal spine effect exists, with the rods having a symmetrical flexural rigidity. Embodiments of the present invention may be formed by ensuring that an appropriate spine (i.e. thickness of additional overlap of material), having appropriate thickness and rigidity to affect the flexural rigidity, is formed within the rod plane.

Preferably, to facilitate rolling of the material around the mandrel, and in particular to maintain an essentially uniform pressure/stress distribution within the material once wrapped around the mandrel, the rods as described herein are formed as having an outer circumference in the shape of a curve of constant width. A curve of constant width is a convex planar shape whose width, measured by the distance between two opposite parallel tangent lines to its boundary, is the same regardless of the direction of those two parallel lines. A curve of constant width may also be known as a shape of constant width. The rod could be formed having a cross-section that is any non-circular curve of constant width e.g. as a polygon with curved sides, such as a Reuleaux polygon. A Reuleaux polygon is a polygon that is a curve of constant width i.e. a curve in which all diameters are the same length. A Reuleaux polygon is a curvilinear polygon built up of circular arcs and, for an odd number of sides, is a curve of constant width. The shape can be formed by providing a suitably shaped mandrel e.g. a mandrel in the shape of a Reuleaux polygon. The desired cross-sectional shape may also be formed using an external mould to press the material, once it is wrapped around the mandrel, into the desired shape. Both a shaped mandrel and a mould can be utilised together, to form the desired shape.

Figure 4B:
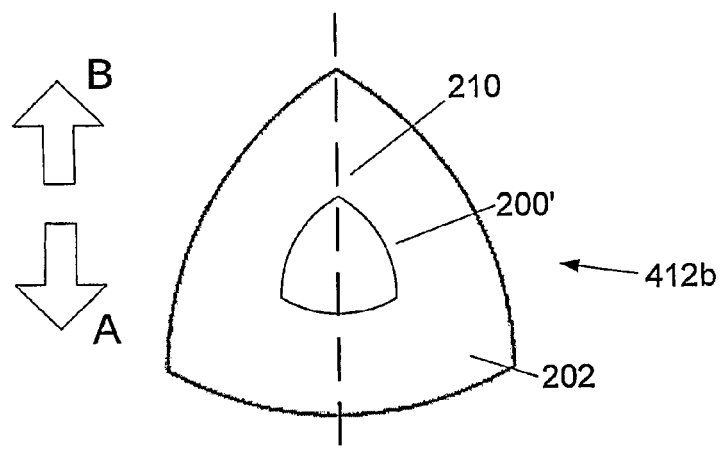
FIGS. 4B and 4C show alternative cross-sections of rods in the shapes of Reuleaux polygons particularly suitable for formation using a mandrel.
Figure 4C:
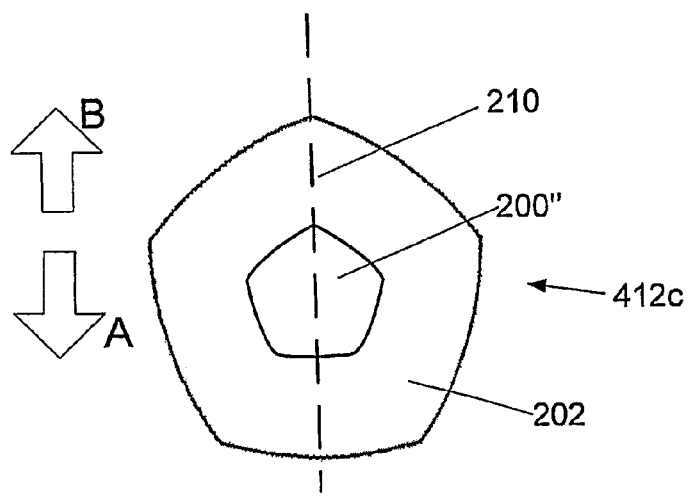

FIGS. 4B and 4C illustrate rod bodies formed as respectively a Reuleaux triangle 412b and a Reuleaux pentagon 412c. In both instances the bore 200', 200'', matches the shape of the outer circumference, indicating that the mandrel was correspondingly shaped. In other words, the mandrel in FIG. 4B was shaped as a Reuleaux triangle, and the mandrel in FIG. 4C shaped as a Reuleaux polygon.

It will be appreciated that the above cross-sectional shapes are described by way of example only and that various alternative shapes will be appropriate for providing the desired asymmetric flexural rigidity. For example, the shapes could be non-regular (e.g. non-regular polygons) and/or polygons having an even number of sides. The cross-sectional shape of the rod could be an irregular curve of constant width. The shape could be a Reuleaux triangle based on an isosceles triangle (as opposed to the Reuleaux triangle illustrated in FIG. 4B which is based on an equilateral triangle).

The rod need not have a circular or polygonal shape, but could take other shapes e.g. the cross-section could be in the form of an eccentric ellipse (e.g. egg-shaped). The shape of the central bore within the rod could be different from the shape defined by the external circumference of the rod. For example, the bore could have a circular shape and the external circumference define an ellipse, or vice versa. The bore could also be non-central within the rod i.e. offset from the centre of the rod.

As an alternative to, or in addition to, a rod having a particular cross-section to provide asymmetric flexural rigidity, the rod can be formed using materials and/or having additional structures, to provide (or enhance) the asymmetric flexural rigidity.

Figure 5A:
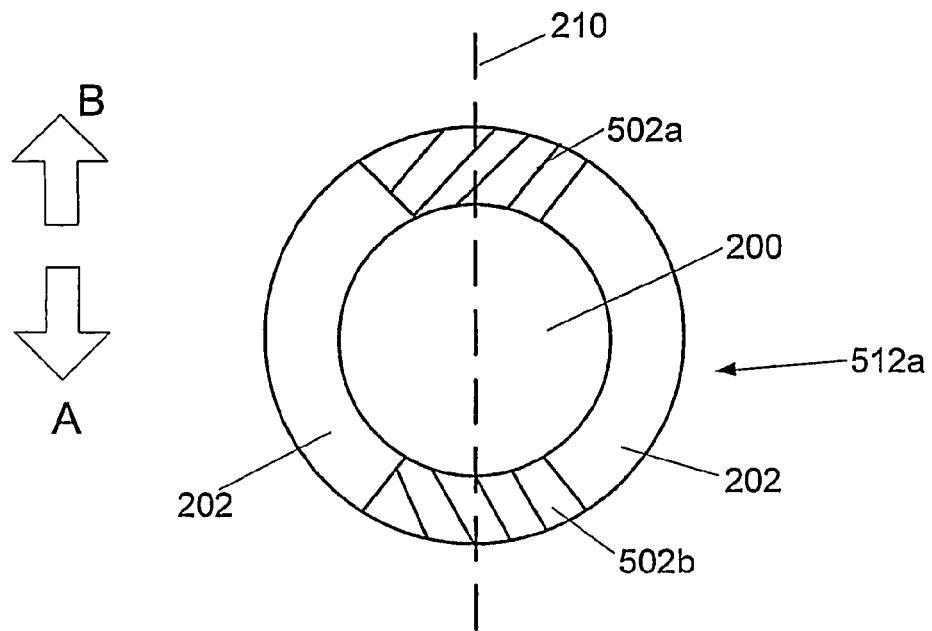
FIGS. 5A-5D illustrates different, alternative cross-sections of the fishing rod of FIG. 2 in accordance with alternative embodiments of the present invention.

FIG. 5A shows the cross-section 512a of a rod formed as a circular tube, having a circular body 202 with an inner circular bore 200. The body 202 is formed such that the material forming the tube section 502a adjacent the casting direction has a different flexural rigidity than the material of the tube section 502b adjacent the opposite direction. For example, section 502a could be formed using carbon fibre that has a higher flexural rigidity than the carbon fibre forming section 502b.

Figure 5B:
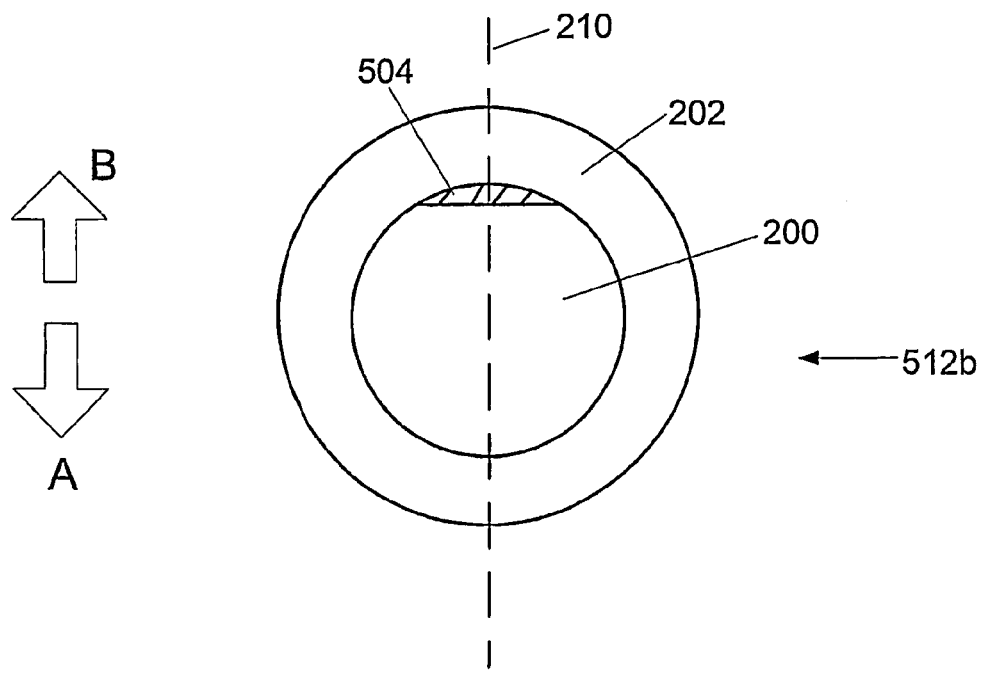
Figure 5C:
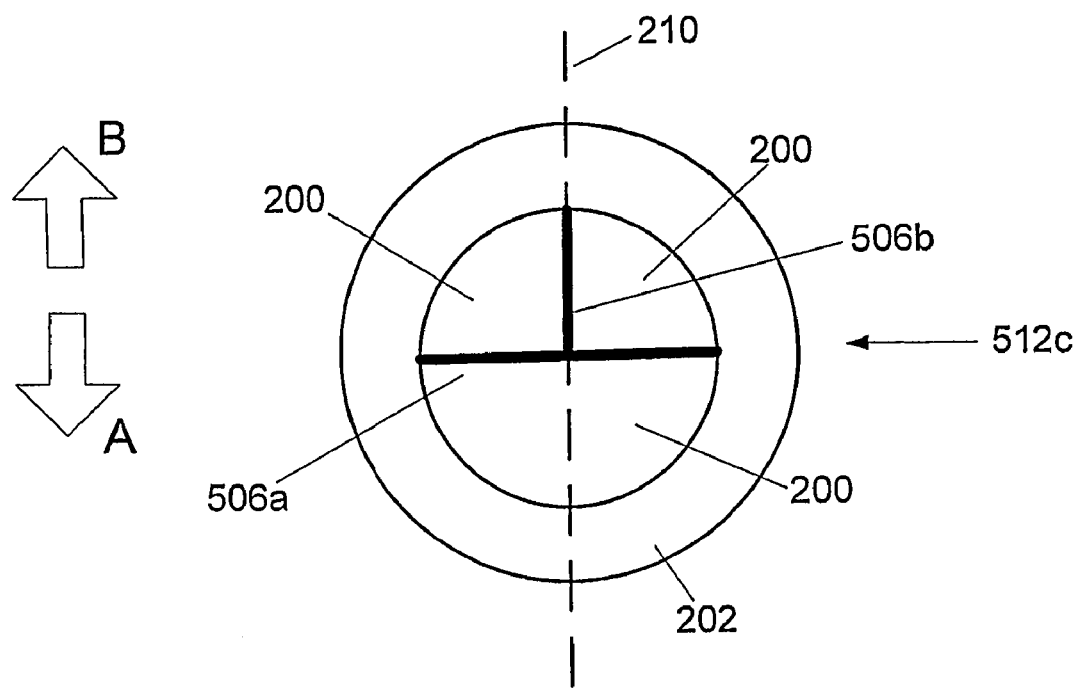
Figure 5D:
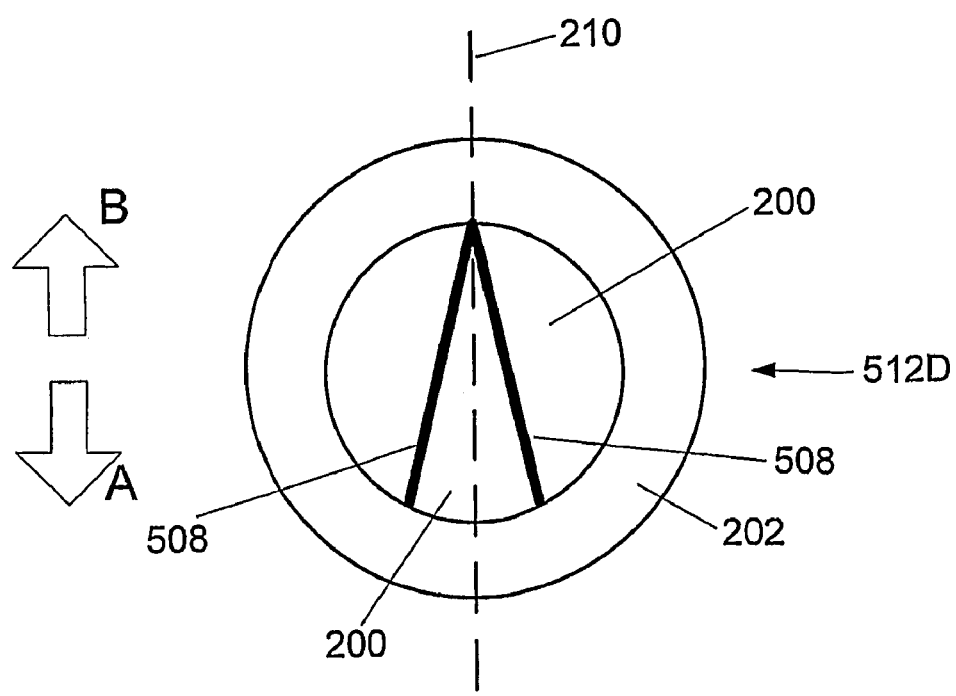

Equally, as shown in FIGS. 5B-5D, a standard rod body 202 could be formed (i.e. a cylindrical tube, having an outer circumference 202 of circular cross-section, and an inner bore 200 of circular cross-section), with the addition of one or more internal ribs or members 504, 506a, 506b, 508 to provide additional flexural rigidity in one direction within the casting plane.

For example, FIG. 5B illustrates the cross-section 512b of a rod having an insert 504 located within the bore 200. The insert 504 extends longitudinally along the rod and is positioned against the bore surface adjacent to the casting direction. Such an insert 504 will thus increase the flexural rigidity in the casting direction.

It will be appreciated that other shaped inserts, including ribs or vanes located within the bore, can be used to provide the desired difference in flexural rigidity within the casting plane. As with the different shapes, it is desirable that such ribs are asymmetrical about a plane perpendicular to the casting plane, which bisects the rod. Preferably the ribs have mirror symmetry about the casting plane 210, so as to provide lateral stability as the rod is cast. For example, FIG. 5C illustrates a rod cross-section 512c including a T-shaped rib 506a, 506b. The cross-piece 506a of the rib extends transverse (perpendicular to) the casting plane 210, whilst a single rib piece 506b extends from the cross-piece 506a along the casting plane to the bore surface. Each of the ends of the T-piece 506a, 506b are coupled to the bore surface.

Similarly, FIG. 5D illustrates a rod cross-section 512d including a rib or vane 508 having a V-shaped cross-section. The apex of the rib 508 is located within the casting plane 210, touching an internal surface of the tubular rod body 202, with the other ends of the rib also touching internal surfaces of the rod body 202. The apex is pointing in the casting direction. In both FIGS. 5C and 5D, the ribs extend longitudinally within the rod, with the cross-section of the rib being indicated.

Asymmetric flexural rigidity of the rod could also be realised by providing a rod having an asymmetric mass distribution. Such an asymmetric mass distribution is intended to affect the moment of inertia of the rod so as to effect directional flexural properties. Such an asymmetric mass distribution could be realised in a number of ways, including providing different weighted inserts within different portions of the rod body, or by providing an asymmetric distribution of holes, ridges or dimples within the rod surface or wall.

The present inventor has also realised that the concept of utilising asymmetric flexural rigidity within fishing rods is not restricted to fly rods and casting rods. Asymmetric flexural rigidity, in which the flexural rigidity in one direction is different from the flexural rigidity in the opposite direction within a plane, is also beneficial for use within other types of fishing rod, in particular fishing poles.

Figure 6:
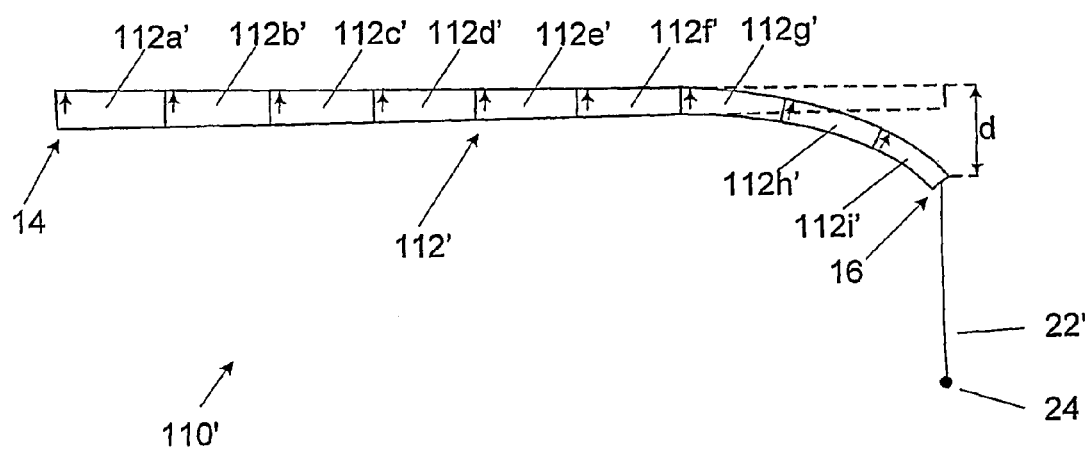
FIG. 6 illustrates a fishing rod in the form of a fishing pole in accordance with an embodiment of the present invention.

For example, FIG. 6 shows a fishing pole (also known as a "bait rod") 110'. In use, such a rod is held substantially parallel to the surface of the water. The body 112' of the rod is relatively long, and may be formed of a relatively large number (e.g. 12 or more) of discrete sections (112a'-112i'). The rod 110' is typically not cast, but instead the lure 24 is placed in the desired position in the water by the fisherman simply extending the rod from the bank/shore on which the fisherman is located.

Typically, such a rod 110' will not include rings 18 to guide the fishing line along the length of the rod. Instead, the fishing line 22' is often attached to the tip 16 of the rod body 112' (or to a position within the end section 112i' of the body 112'). The line 22' may be coupled to the rod body 112' by a length of relatively flexible, resilient material (e.g. elastomeric cord or tube), so as to absorb/buffer the various transient impulses upon the rod and line that occur as a fish is played-with or landed.

In use, such fishing poles typically droop to an excessive degree, i.e. there is a relatively large deflection of the rod tip due to the relatively large weight of the relatively long rod. This deflection undesirably reduces the control the angler has over the location of the rod tip by exaggerating any inadvertent slight movement of the rod handle by the angler. The present inventor has realised that to minimise this droop, the rod can be formed having an asymmetric flexural rigidity, so as to allow the rod to be oriented to position the side of the rod having the greatest flexural rigidity downwards. The rod body 112' of the embodiment shown in FIG. 6 is formed having such an asymmetric flexural rigidity. Thus, the degree of droop (indicated by the letter d within the Figure) at the tip 16 is reduced compared to prior art rods.

To assist in ensuring that the rod is correctly oriented, a sign or mark can be placed on the rod indicative of the direction having the greatest flexural rigidity. The sign or mark can be placed on one particular section of the body, or can be placed along each and every section 112a'-112i' of the rod body 112'. Such a sign or mark could point towards the direction having the greatest flexural rigidity. Alternatively, the sign or mark could point in the opposite direction away from the direction having the greatest flexural rigidity (thus implicitly indicating the direction of greatest flexural rigidity). For example, FIG. 6 illustrates each section of the rod body including a small arrow, pointing upwards, so as to indicate the desired orientation of each rod section for ensuring that the direction having the greatest flexural rigidity is positioned lowermost, so as to minimise the droop of the rod.

The present inventor has also realised that the tubular structure, as described herein, could be utilised in other applications than fishing rods. For example, the tubular structure could be used to provide a load bearing member for use in a variety of engineering applications, including for example, aerospace and motor racing applications. The exploitation of the directional or asymmetric flexural properties of such a member can be beneficial in such applications, and an improvement over current prior art members.

Such a tubular structure could take the formation (and be manufactured) as described in respect of any of the fishing rods described herein. However, most preferably, the tubular structure is formed having a cross-section that is a non-circular curve of constant width i.e. any curve of constant width that is not a circle. Examples include the polygonal cross-section curves of constant width e.g. shapes described with respect to FIGS. 4B or 4C.

The tubular structure can be readily formed using a mandrel having a non-circular cross-section that is a curve of constant width. The curve of constant width allows the tubular structure to be easily manufactured, by wrapping of a flexible material around the mandrel e.g. in a rolling operation. The flexible material can comprise any known type of flexible material that can subsequently be set or cured. For example, the flexible material could comprise sheets of fibre (e.g. glass-fibre or carbon-fibre, including composites thereof). The flexible material could also comprise an appropriate binder e.g. epoxy resin. Alternatively, the binder could be applied subsequently to the flexible material, after it has been wrapped around the mandrel.

Once the flexible material has been wrapped around the mandrel, with the appropriate binder in place, then the material will be cured or set. For example, the flexible material could be cured using heat, UV (ultra-violet radiation) or chemical curing. The mandrel could then be removed from the tubular structure.

The present inventor has realised that mandrels need not be circular. Indeed, the advantages of employing a non-circular curve of constant width as the cross sectional shape of a mandrel (as opposed to a cross sectional shape that is not a curve of constant width) for use in a manufacturing process that is based upon rolling/wrapping flexible sheet material around the mandrel are similar to some of the advantages of using a circular mandrel. The curve of constant width provides an essentially uniform pressure/stress distribution within the material as it is rolled upon/wrapped around the mandrel. The alternative, i.e. wrapping/rolling material around a mandrel that is not a curve of constant width, will introduce localised regions of stress concentration within the material. Such stress concentrations may be detrimental in the final product form e.g. may lead to premature and/or catastrophic failure of the product when in use.

Based on teachings herein, other configurations of ribs, rod shapes, tubular structures and inserts will be apparent to the skilled person as falling within the scope of the present invention.

The invention claimed is:

1. A method of manufacturing a tubular structure extending within a plane, comprising the step of forming a tubular structure with at least a portion of the tubular structure having a flexural rigidity in a first direction within the plane different from a flexural rigidity in an opposite direction to the first direction within the plane, the difference in flexural rigidity between said directions being at least 5% of a value of the flexural rigidity in the first direction, and wherein a cross-section of said portion is formed in a shape that is a non-circular curve of constant width.

2. A method as claimed in claim 1, comprising:
wrapping a flexible material around a mandrel;
curing the material to form a tube; and
removing the mandrel from the tube.

3. A method as claimed in claim 2, wherein said mandrel has a cross-section that is a non-circular curve of constant width.

4. A method as claimed in claim 2, wherein said mandrel comprises a polygonal cross-section having an odd number of sides.

5. A method as claimed in claim 2, wherein said material comprises carbon fibre.

6. A method as claimed in claim 1, wherein the cross-section of said portion is formed as a polygon having an odd number of sides, with an apex of the polygon being located within the plane.

7. A method as claimed in claim 6, wherein said polygon is a Reuleaux polygon.

8. The method as claimed in claim 6, wherein said polygon is one of: a triangle, a pentagon, and a heptagon.

9. The method as claimed in claim 8, wherein said polygon is a triangle.

10. A method of manufacturing a tubular structure, comprising:
wrapping a flexible material around a mandrel;
curing the material to form a tubular structure; and
removing the mandrel from the tubular structure,
wherein the mandrel comprises a non-circular cross-section that is a curve of constant width.

* * * * *